US008260871B2

(12) United States Patent
Fallen et al.

(10) Patent No.: US 8,260,871 B2
(45) Date of Patent: Sep. 4, 2012

(54) INTELLIGENT COLLECTION OF DIAGNOSTIC DATA FOR COMMUNICATION TO DIAGNOSIS SITE

(75) Inventors: Marcus Fallen, Belmont, CA (US); Benoit Dageville, Foster City, CA (US); Jonathan Klein, Redwood City, CA (US); Ajith Kumar Mysorenagarajarao, San Mateo, CA (US); Gary Ngai, Saratoga, CA (US); Mark Ramacher, San Carlos, CA (US); Yair Sarig, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 86 days.

(21) Appl. No.: 12/251,700

(22) Filed: Oct. 15, 2008

(65) Prior Publication Data
US 2009/0106363 A1 Apr. 23, 2009

Related U.S. Application Data

(60) Provisional application No. 60/981,456, filed on Oct. 19, 2007.

(51) Int. Cl.
*G06F 15/16* (2006.01)
(52) U.S. Cl. ............. 709/207; 709/223; 714/39; 714/48
(58) Field of Classification Search .................. 709/225, 709/207; 714/37, 48
See application file for complete search history.

(56) References Cited

U.S. PATENT DOCUMENTS

| 4,866,635 | A | 9/1989 | Kahn et al. |
| 5,067,099 | A | 11/1991 | McCown et al. |
| 5,123,017 | A | 6/1992 | Simpkins et al. |
| 5,309,448 | A | 5/1994 | Bouloutas et al. |
| 5,845,272 | A | 12/1998 | Morjaria et al. |
| 5,920,489 | A | 7/1999 | Dibrino et al. |
| 5,922,079 | A | 7/1999 | Booth et al. |
| 5,968,122 | A | 10/1999 | Schlosser et al. |
| 6,012,152 | A | 1/2000 | Douik et al. |
| 6,125,311 | A | 9/2000 | Lo |
| 6,182,249 | B1 | 1/2001 | Wookey et al. |
| 6,208,955 | B1 | 3/2001 | Provan et al. |
| 6,237,114 | B1 | 5/2001 | Wookey et al. |

(Continued)

FOREIGN PATENT DOCUMENTS
EP 633536 A1 11/1995

OTHER PUBLICATIONS

Alexandru, M., et al., "An architectural system solution for technical diagnosis," pp. TuD5—17—TuD5-22, International Society of Information Fusion (ISIF), Copyright 2000. [Can also be found in Information Fusion 2000, Jul. 10-13, 2000, vol. 1.].

(Continued)

*Primary Examiner* — Tammy Nguyen
(74) *Attorney, Agent, or Firm* — Kilpatrick Townsend & Stockton LLP

(57) ABSTRACT

Techniques for intelligently identifying diagnostic data to be communicated from a product or system site (e.g., a customer site) to a diagnosis site (e.g., a vendor site). An appropriate amount of diagnostic data is identified to facilitate efficient and quick diagnosis and error resolution. Techniques are also provided that enable a customer to review the data identified for transmission to the diagnosis site prior to the transmission.

29 Claims, 8 Drawing Sheets

U.S. PATENT DOCUMENTS

| | | |
|---|---|---|
| 6,243,628 B1 | 6/2001 | Bliley et al. |
| 6,349,335 B1 | 2/2002 | Jenney |
| 6,434,512 B1 | 8/2002 | Discenzo |
| 6,519,552 B1 | 2/2003 | Sampath et al. |
| 6,535,865 B1 | 3/2003 | Skaaning et al. |
| 6,539,337 B1 | 3/2003 | Provan et al. |
| 6,604,141 B1 | 8/2003 | Ventura |
| 6,615,090 B1 | 9/2003 | Blevins et al. |
| 6,633,782 B1 | 10/2003 | Schleiss et al. |
| 6,665,425 B1 | 12/2003 | Sampath et al. |
| 6,681,215 B2 | 1/2004 | Jammu |
| 6,697,810 B2 | 2/2004 | Kumar et al. |
| 6,697,962 B1 | 2/2004 | McCrory et al. |
| 6,738,811 B1 | 5/2004 | Liang |
| 6,782,345 B1 | 8/2004 | Siegel et al. |
| 6,862,698 B1 | 3/2005 | Shyu |
| 6,892,317 B1 | 5/2005 | Sampath et al. |
| 6,910,000 B1 | 6/2005 | Yedidia et al. |
| 6,915,128 B1 | 7/2005 | Oh |
| 6,944,800 B2* | 9/2005 | Brundridge et al. ............ 714/48 |
| 6,983,200 B2 | 1/2006 | Bodin et al. |
| 6,985,901 B1 | 1/2006 | Sachse et al. |
| 7,062,749 B2 | 6/2006 | Cyr et al. |
| 7,096,387 B2 | 8/2006 | Durrant et al. |
| 7,113,988 B2 | 9/2006 | Chirashnya et al. |
| 7,124,328 B2* | 10/2006 | Bowers et al. .................. 714/39 |
| 7,165,190 B1 | 1/2007 | Srivastava et al. |
| 7,177,769 B2 | 2/2007 | Larsson et al. |
| 7,257,744 B2 | 8/2007 | Sabet et al. |
| 7,281,040 B1 | 10/2007 | Ly |
| 7,281,170 B2 | 10/2007 | Taylor et al. |
| 7,308,385 B2 | 12/2007 | Wegerich et al. |
| 7,313,735 B1 | 12/2007 | Levergood et al. |
| 7,500,143 B2 | 3/2009 | Buia et al. |
| 7,525,910 B2 | 4/2009 | Wen |
| 7,546,222 B2 | 6/2009 | Chintalapti et al. |
| 7,577,872 B2 | 8/2009 | DiBartolomeo et al. |
| 7,603,674 B2 | 10/2009 | Cyr et al. |
| 7,668,953 B1 | 2/2010 | Sinclair et al. |
| 7,802,144 B2 | 9/2010 | Vinberg et al. |
| 7,937,623 B2* | 5/2011 | Ramacher et al. .............. 714/37 |
| 7,941,707 B2* | 5/2011 | Sarig et al. .................. 714/47.1 |
| 7,954,090 B1 | 5/2011 | Qureshi et al. |
| 8,032,625 B2 | 10/2011 | Benfield et al. |
| 2003/0033559 A1* | 2/2003 | Williams ........................ 714/39 |
| 2003/0074607 A1* | 4/2003 | Brundridge et al. ............ 714/48 |
| 2004/0078683 A1 | 4/2004 | Buia et al. |
| 2004/0078695 A1* | 4/2004 | Bowers et al. .................. 714/39 |
| 2004/0078727 A1 | 4/2004 | Little et al. |
| 2004/0153429 A1 | 8/2004 | Horn et al. |
| 2004/0193956 A1 | 9/2004 | Greenlee et al. |
| 2005/0102567 A1 | 5/2005 | McGuire et al. |
| 2005/0120273 A1 | 6/2005 | Hudson et al. |
| 2005/0160325 A1 | 7/2005 | Ogino et al. |
| 2005/0210331 A1 | 9/2005 | Connelly et al. |
| 2005/0228880 A1 | 10/2005 | Champlin |
| 2006/0150156 A1 | 7/2006 | Cyr et al. |
| 2006/0200711 A1 | 9/2006 | Schondelmayer et al. |
| 2006/0256727 A1 | 11/2006 | Acharya et al. |
| 2007/0021966 A1 | 1/2007 | Ellefson et al. |
| 2007/0283329 A1 | 12/2007 | Caprihan et al. |
| 2007/0294003 A1 | 12/2007 | Underdal et al. |
| 2008/0065706 A1 | 3/2008 | Miller et al. |
| 2008/0109796 A1 | 5/2008 | Kosche |
| 2008/0125877 A1 | 5/2008 | Miller et al. |
| 2008/0133978 A1 | 6/2008 | Angamuthu et al. |
| 2008/0141072 A1 | 6/2008 | Kalgren et al. |
| 2008/0189488 A1 | 8/2008 | DeWitt et al. |
| 2008/0208784 A1 | 8/2008 | Hill et al. |
| 2008/0208787 A1 | 8/2008 | Luchene |
| 2008/0255885 A1 | 10/2008 | Eisenberger et al. |
| 2008/0263399 A1 | 10/2008 | Cousin et al. |
| 2008/0282095 A1 | 11/2008 | Haider et al. |
| 2008/0297375 A1 | 12/2008 | Khuzadi |
| 2009/0028055 A1 | 1/2009 | Zaencker et al. |
| 2009/0083576 A1 | 3/2009 | Vlassova et al. |
| 2009/0105982 A1 | 4/2009 | Sarig et al. |
| 2009/0105989 A1 | 4/2009 | Ramacher et al. |
| 2009/0105991 A1 | 4/2009 | Ramacher et al. |
| 2009/0106180 A1 | 4/2009 | Kuchibhotla et al. |
| 2009/0106262 A1 | 4/2009 | Fallen et al. |
| 2009/0106278 A1 | 4/2009 | Ramacher et al. |
| 2009/0106589 A1 | 4/2009 | Ramacher et al. |
| 2009/0106595 A1 | 4/2009 | Sarig et al. |
| 2009/0106596 A1 | 4/2009 | Fallen et al. |
| 2009/0106601 A1 | 4/2009 | Ngai et al. |
| 2009/0106605 A1 | 4/2009 | Kuchibhotla et al. |
| 2009/0327815 A1 | 12/2009 | Sridharan et al. |
| 2010/0100778 A1 | 4/2010 | Sullivan |
| 2010/0257410 A1 | 10/2010 | Cottrell et al. |
| 2011/0153540 A1 | 6/2011 | Beg et al. |

OTHER PUBLICATIONS

U.S. Appl. No. 12/485,759, filed Jun. 16, 2009, Beg et al.

U.S. Appl. No. 12/485,763, filed Jun. 16, 2009, Beg et al.

U.S. Appl. No. 12/485,766, filed Jun. 16, 2009, Beg et al.

U.S. Appl. No. 12/641,038, filed Dec. 17, 2009, Beg et al.

Avin, C., et al., "Identifiability of Path-Specific Effects," UCLA Cognitive Systems Laboratory, Technical Report R-321 of Jun. 2005, in Proceedings of the 19th International Joint Conference on Artificial Intelligence, Edinburgh, Scotland, Aug. 2005, 7 pages.

Haicheng, W., et al., "Research on The Function Model of Distributed Intelligent Monitoring and Diagnosis System Based on Multi-Agent," in Electronic Measurement and Instruments, 2007, the Eighth International Conference on Electronic Measurement and Instruments, ICEMI 2007, pp. 3-393-3-396, copyright 2007 IEEE.

Halpern, J. Y., et al., "Causes and Explanations: A Structural-Model Approach—Part I: Causes," Technical Report R-266-UAI of Jun. 2001, in Proceedings of the Seventeenth Conference on Uncertainty in Artificial Intelligence, San Francisco, CA, 2001, pp. 194-202. [Can also be found in British Journal of Philosophy of Science, vol. 56, 2005, pp. 843-887.].

Halpern, J. Y., et al., "Causes and Explanations: A Structural-Model Approach—Part II: Explanations," Technical Report R-266-IJCAI of Jun. 2001, in Proceedings of the Seventeenth International Joint Conference on Artificial Intelligence (IJCAI), San Francisco, CA, 2001, 8 pages. [Can also be found in British Journal of Philosophy of Science, vol. 56, 2005, pp. 889-911.].

Jongsawat, N., et al., "Dynamic Data Feed to Bayesian Network Model and SMILE Web Application," in Ninth ACIS International Conference on Software Engineering, Artificial Intelligence, Networking, and Parallel/Distributed Computing, pp. 931-936, Copyright 2008 IEEE.

Morjaria, M., et al., "Monitoring Complex Systems with Causal Networks," IEEE Computational Science & Engineering, vol. 3, Issue 4, Winter 1996, pp. 9-10.

Nielsen, U. H., et al., "Explanation Trees for Causal Bayesian Networks," 8 pages. [Can also be found in Proceedings of the 24th Annual Conference on Uncertainty in Artificial Intelligence (UAI-08), 2008, pp. 427-434.].

Pearl, J., "Causal Diagrams for Empirical Research (With Discussions)," Technical Report R-218-B, Biometrika, vol. 82, No. 4, 1995, pp. 669-710, printed in Great Britain.

Pearl, J., "Causal Inference in Statistics: An Overview," Technical Report R-350 of Sep. 2009, Statistics Surveys, vol. 3, 2009, pp. 96-146.

Pearl, J., "Direct and Indirect Effects," Technical Report R-273-UAI of Jun. 2001, In Proceedings of the Seventeenth Conference on Uncertainty in Artificial Intelligence, San Francisco, CA, 2001, pp. 411-420.

Pearl, J., "Robustness of Causal Claims," Technical Report R-320 of Mar. 2004, Submitted to the 20th Conference on Uncertainty in Artificial Intelligence, Banff, Canada, Jul. 2004, 8 pages. [Can also be found in Proceedings of the 20th Conference on Uncertainty in Artificial Intelligence, AUAI Press, Arlington, VA, Jul. 2004, pp. 446-453.].

Pearl, J., "Simpson's Paradox: An Anatomy," Technical Report R-264, Extracted from Chapter 6 of Causality, Apr. 1999, pp. 1-11.

Pearl, J., "Statistics and Causal Inference: A Review," Test Journal, vol. 12, No. 2, Dec. 2003, pp. 281-345.

Pearl, J., "The Logic of Counterfactuals in Causal Inference (Discussion of 'Causal Inference without Counterfactuals' by A.P. Dawid)," Technical Report R-269 of Apr. 2000, in Journal of American Statistical Association, vol. 95, No. 450, Jun. 2000, pp. 428-435.

Tian, J., et al., "A General Identification Condition for Causal Effects," Technical Report R-290-A of Aug. 2002, in Proceedings of the Eighteenth National Conference on Artificial Intelligence, AAAI Press/The MIT Press: Menlo Park, CA, Aug. 2002, pp. 567-573.

Tian, J., et al., "Probabilities of Causation: Bounds and Identification," Technical Report R-271-A of Feb. 2000, in Annals of Mathematics and Artificial Intelligence, vol. 28, 2000, pp. 287-313.

Uraikul, V., "Artificial Intelligence for Monitoring and Supervisory Control of Process Systems," Science Direct, in Engineering Applications of Artificial Intelligence, vol. 20, Issue 2, Mar. 2007, 17 pages (pages 115-131 in publication), Copyright 2006 Elsevier Ltd.

Yu, J., et al., "Intelligent Monitoring and Diagnosis of Manufacturing Processes Using an Integrated Approach of KBANN and GA," Science Direct, in Computers in Industry, Vol. 59, Issue, May 2008, 13 pages (pages 489-501 in publication), Copyright 2007 Elsevier B.V.

B.V. Zhang, D., et al., "Researches and Application of a Hybrid Fault Diagnosis Expert System," Proceedings of the $3^{rd}$ World Congress on Intelligent Control and Automation, Jun. 28-Jul. 2, 2000, Hefei, P.R. China, pp. 215-219, Copyright 2000 IEEE.

Non-Final Office Action for U.S. Appl. No. 12/485,766 mailed on Jan. 25, 2011; 21 pages.
Notice of Allowance for U.S. Appl. No. 12/252,056 mailed on Jan. 6, 2011; 6 pages.
Notice of Allowance for U.S. Appl. No. 12/251,671 mailed on Jan. 5, 2011; 6 pages.
Non-Final Office Action for U.S. Appl. No. 12/252,128 mailed on Dec. 23, 2010; 19 pages.
Non-Final Office Action for U.S. Appl. No. 12/485,759 mailed on Dec. 21, 2010; 21 pages.
Non-Final Office Action for U.S. Appl. No. 12/251,743 mailed on Dec. 14, 2010; 19 pages.
Non-Final Office Action for U.S. Appl. No. 12/251,661 mailed on Nov. 10, 2010; 18 pages.
Non-Final Office Action for U.S. Appl. No. 12/251,711 mailed on Nov. 9, 2010; 18 pages.
Non-Final Office Action for U.S. Appl. No. 12/251,731 mailed on Mar. 2, 2011; 36 pages.
Non-Final Office Action for U.S. Appl. No. 12/251,677 mailed on Mar. 1, 2011; 24 pages.
Non-Final Office Action for U.S. Appl. No. 12/251,648 mailed on Mar. 1, 2011; 35 pages.
Office Communication for U.S. Appl. No. 12/251,671 mailed on Feb. 9, 2011; 4 pages.
Non-Final Office Action for U.S. Appl. No. 12/251,671 mailed on Sep. 17, 2010; 13 pages.
Non-Final Office Action for U.S. Appl. No. 12/252,056 mailed on Sep. 21, 2010; 17 pages.
Final Office Action for U.S. Appl. No. 12/251,731 mailed on Sep. 23, 2011, 23 pages.
Notice of Allowance for U.S. Appl. No. 12/251,667 mailed on Sep. 20, 2011, 9 pages.
Non-Final Office Action for U.S. Appl. No. 12/251,648 mailed on Sep. 20, 2011, 25 pages.
Non-Final Office Action for U.S. Appl. No. 12/252,070 mailed on Aug. 25, 2011, 7 pages.
Final Office Action for U.S. Appl. No. 12/252,128 mailed on Aug. 12, 2011, 10 pages.
Notice of Allowance for U.S. Appl. No. 12/251,711 mailed on Aug. 11, 2011, 1 page.
Notice of Allowance for U.S. Appl. No. 12/485,766 mailed on Aug. 10, 2011, 1 page.
Final Office Action for U.S. Appl. No. 12/485,759 mailed on Aug. 8, 2011, 12 pages.
Non-Final Office Action for U.S. Appl. No. 12/251,743 mailed on Jul. 19, 2011, 11 pages.
Final Office Action for U.S. Appl. No. 12/251,661 mailed on Jun. 8, 2011, 15 pages.
Non-Final Office Action for U.S. Appl. No. 12/251,685 mailed on May 31, 2011, 9 pages.
Final Office Action for U.S. Appl. No. 12/251,711 mailed on May 19, 2011, 6 pages.
Office Action for U.S. Appl. No. 12/251,667 (Jan. 17, 2012).
Office Action for U.S. Appl. No. 12/251,685 (Jan. 9, 2012).
Notice of Allowance for U.S. Appl. No. 12/252,128 (Dec. 12, 2011).
Notice of Allowance for U.S. Appl. No. 12/485,759 (Dec. 19, 2011).
Notice of Allowance for U.S. Appl. No. 12/252,070 (Feb. 8, 2012).

* cited by examiner

| Select | Source | Name | Size (MB) | Has User Data | Timestamp | Path | View |
|---|---|---|---|---|---|---|---|
| ☐ | Incident | mydb1_ora_13579_i4850.trc | 0 | No | May 4, 2007 9:46:11 PM PDT | /ade/sfogel_emdb/oracle/log/diag/ rdbms/emdb/emdb/incident/incdir_4850 | |
| ☐ | Incident | mydb1_ora_13579_i4850_2.trc | 0 | No | May 4, 2007 9:46:11 PM PDT | /ade/sfogel_emdb/oracle/log/diag/ rdbms/emdb/emdb/incident/incdir_4850 | |
| ☐ | Incident | mydb1_ora_13579_i4849.trc | 0 | No | May 4, 2007 9:44:48 PM PDT | /ade/sfogel_emdb/oracle/log/diag/ rdbms/emdb/emdb/incident/incdir_4849 | |
| ☐ | Incident | mydb1_ora_13579_i4849.trc | 0 | No | May 4, 2007 9:46:48 PM PDT | /ade/sfogel_emdb/oracle/log/diag/ rdbms/emdb/emdb/incident/incdir_4849 | |

FIG. 4D

INTELLIGENT COLLECTION OF DIAGNOSTIC DATA FOR COMMUNICATION TO DIAGNOSIS SITE

CROSS-REFERENCES TO RELATED APPLICATIONS

This application claims the benefit and priority under 35 U.S.C. 119(e) of U.S. Provisional Application Ser. No. 60/981,456, filed Oct. 19, 2007, entitled DIAGNOSABILITY FRAMEWORK, the contents of which are herein incorporated by reference in their entirety for all purposes.

The present application also incorporates by reference for all purposes the entire contents of the following related and commonly-assigned non-provisional applications, all filed concurrently with the present application:

(1) U.S. Non-Provisional Application No. 12/252,056, filed Oct. 15, 2008, now U.S. Publication No. 2009/0106278, published Apr. 23, 2009;

(2) U.S. Non-Provisional Application No. 12/251,648, filed Oct. 15, 2008, now U.S. Publication No. 2009/0105991, published Apr. 23, 2009;

(3) U.S. Non-Provisional Application No. 12/251,711, filed Oct. 15, 2008, now U.S. Publication No. 2009/0105989, published Apr. 23, 2009;

(4) U.S. Non-Provisional Application No. 12/251,661, filed Oct. 15, 2008, now U.S. Publication No. 2009/0106601, published Apr. 23, 2009;

(5) U.S. Non-Provisional Application No. 12/251,667, filed Oct. 15, 2008, now U.S. Publication No. 2009/0105982, published Apr. 23, 2009;

(6) U.S. Non-Provisional Application No. 12/251,671, filed Oct. 15, 2008, now U.S. Publication No. 2009/0106595, published Apr. 23, 2009;

(7) U.S. Non-Provisional Application No. 12/251,685, filed Oct. 15, 2008, now U.S. Publication No. 2009/0106262, published Apr. 23, 2009;

(8) U.S. Non-Provisional Application No. 12/252,070, filed Oct. 15, 2008, now U.S. Publication No. 2009/0106180, published Apr. 23, 2009;

(9) U.S. Non-Provisional Application No. 12/252,128, filed Oct. 15, 2008, now U.S. Publication No. 2009/0106605, published Apr. 23, 2009;

(10) U.S. Non-Provisional Application No. 12/251,731, filed Oct. 15, 2008, now U.S. Publication No. 2009/0106589, published Apr. 23, 2009; and

(11) U.S. Non-Provisional Application No. 12/251,743, filed Oct. 15, 2008, now U.S. Publication No. 2009/0106596 published Apr. 23, 2009.

BACKGROUND OF THE INVENTION

Embodiments of the present invention relate to system maintenance and diagnostics, and more particularly to techniques for preparing a package of diagnostic data for shipping to a diagnosis site for analysis.

Diagnosing defects in systems, such as Oracle database (DB) products, can be a complex and time-consuming task. In a complex software environment, the diagnostic data required to resolve an issue or problem can come from different sources and may be stored in multiple locations. For example, for a system comprising multiple components, the state of the various components may be held in different log files, diagnostic traces corresponding to the components may be stored in different repositories, and the like.

In a typical diagnostic flow, diagnostic data captured at system site (e.g., a customer site executing a product instance) is communicated to a diagnosis site (e.g., the site of the product vendor) for failure analysis. At the diagnosis site, the data received from the system site is analyzed to determine for example, occurrence of an error in the system, a root cause of the error, recommendations for mitigating effects of the errors, repair solutions to fix the error, and the like. The results of the analysis may be communicated from the diagnosis site to the system site.

However, due to the sheer amount of diagnostic data that may be captured for a system and the often disorganized manner in which the data is stored at the product site, it is often a difficult task to establish what diagnostic data is available at the system site and further what pieces of diagnostic data should be submitted to the vendor for analysis. If too little information is provided to the vendor, the amount of submitted data may be insufficient to perform a proper diagnosis of the error. The vendor then has to often contact the customer again and request additional information, some of which might no longer be available. Further analysis is possible only after receiving the additional requested information. This may take several back-and-forth communications between the customer and the vendor before the error can be diagnosed. On the other hand, sending too much diagnostic information is also problematic. The amount of data that is sent may include thousands of files and many gigabytes of data. Sending such a large volume of data to the diagnosis site is cumbersome, time consuming, and expensive. Further, if the data received at a diagnosis site is very large, it takes the vendor a long time to analyze the received diagnostic data to identify relevant pieces of data for analyzing a particular problem. Accordingly, under either scenario, the time needed to resolve the issue or problem is increased, leading to customer dissatisfaction.

Further, the diagnostic data that is communicated from the customer site to the vendor site may comprise information that may be considered sensitive or confidential by the customer. For instance, traces collected at a customer site may contain sensitive information such as network addresses or database schema details of the customer, export dumps may contain data from database tables storing sensitive or confidential information such as customer payroll details, etc. As a result, in the past, customers have been reluctant to allow communication of diagnostic data to vendor sites fearing disclosure of sensitive and confidential information. For example, banks have typically refused to send diagnostic data to a diagnosis site fearing that the data may contain information that is sensitive to the bank.

In light of the above, techniques are desired for improving the manner in which diagnostic data is identified and communicated from the system site or customer site to the vendor.

BRIEF SUMMARY OF THE INVENTION

Embodiments of the present invention provide techniques for intelligently identifying diagnostic data to be communicated from a product or system site (e.g., a customer site) to a diagnosis site (e.g., a vendor site). An appropriate amount of diagnostic data is identified to facilitate efficient and quick diagnosis and error resolution. Techniques are also provided that enable a customer to review the data identified for transmission to the diagnosis site prior to the transmission.

According to an embodiment of the present invention, techniques are provided for identifying diagnostic data for communication from a first site to a second site. A request may be received at the first site to create a package to be communicated from the first site to the second site. A first set of one or more incidents may be identified based upon the request, each incident corresponding to an error in a system at the first site. A second set of incidents may be identified correlated to the first set of incidents. Diagnostic data may be determined for the first set of incidents and the second set of incidents and a package prepared comprising the diagnostic data determined for the first set of incidents and the second set of incidents. The request may identify one or more incidents.

In one embodiment, the request may identify a problem. A plurality of incidents may be identified based upon the problem and the first set of incidents determined from the plurality of incidents, wherein the first set of incidents is a subset of the plurality of incidents. Identifying the plurality of incidents may comprise determining incidents that correspond to the problem based upon a problem key associated with each incident, the problem key associated with an incident identifying a set of attributes associated with the incident. The incidents included in the plurality of incidents may have the same associated problem key. In another embodiment, determining the first set of incidents may comprise determining the first set based upon a time associated with the incidents in the plurality of incidents.

In one embodiment, determining the second set of incidents may comprise determining the second set of incidents based upon one or more correlation keys associated with the second set of incidents and one or more correlation keys associated with the first set of incidents, wherein each correlation key associated with an incident specifies an attribute and a value associated with the attribute for the incident.

In another embodiment, determining the second set of incidents may comprise determining if an incident is to be included in the second set of incidents based upon a value associated with an attribute of the incident and a value associated with the same attribute of at least one incident in the first set of incidents. The attribute of an incident may be a time when the incident was created, a process or system component or session in which an error that caused creation of the incident occurred, a logical operation that resulted in an error that caused creation of the incident, or a context identifier associated with the incident.

In one embodiment, diagnostic data may be determined that is correlated to the diagnostic data determined for the first set of incidents and the second set of incidents. Preparing the package may comprise including the correlated diagnostic data in the package. The correlated diagnostic data may be determined by determining the correlated diagnostic data using one or more correlation keys associated with the first set of incidents and the second set of incidents, wherein each correlation key associated with an incident specifies an attribute and a value associated with the attribute.

In one embodiment, the package that is prepared at the first site is communicated from the first site to the second site.

The foregoing, together with other features and embodiments will become more apparent when referring to the following specification, claims, and accompanying drawings.

BRIEF DESCRIPTION OF THE DRAWINGS

FIGS. 4A, 4B, 4C, and 4D depict various interfaces for generating packages according to an embodiment of the present invention.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for intelligently identifying diagnostic data to be communicated from a product or system site (e.g., a customer site) to a diagnosis site (e.g., a vendor site) that is typically remote from the system site. An appropriate amount of diagnostic data is identified to facilitate efficient and quick diagnosis and error resolution. Techniques are also provided that enable a customer to review the data identified for transmission to the diagnosis site prior to the transmission. The identified diagnostic data may be modified as desired prior to communication of data to the diagnosis site such that data that the customer does not want to be sent to the diagnosis site is excluded from the data communicated to the diagnosis site. The excluded data may include for example data that the customer deems as sensitive or confidential. In this manner, the customer has control over the diagnostic data that is communicated from the system site to the diagnosis site.

Figure 1:
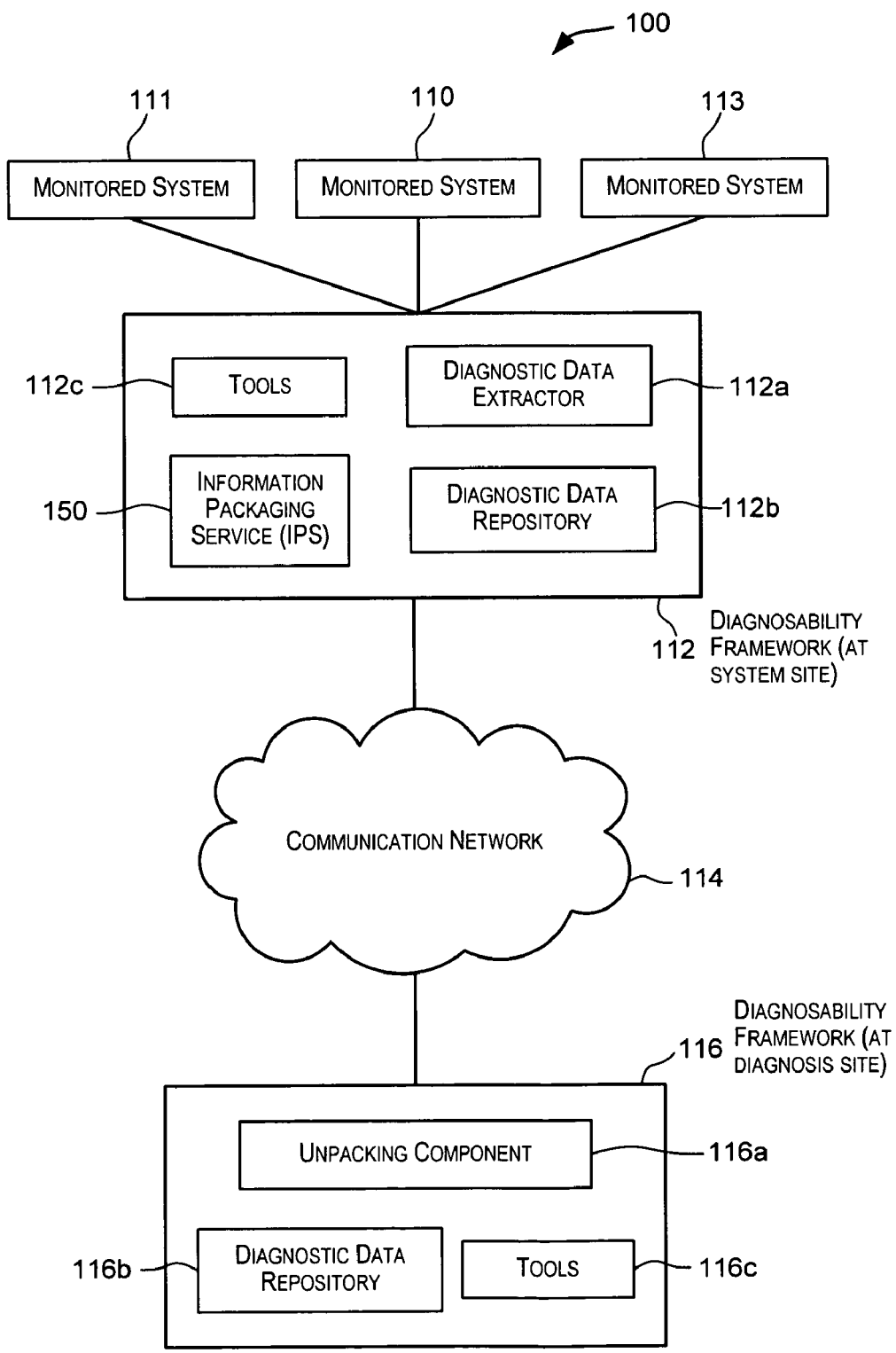
FIG. 1 is a simplified block diagram of a diagnosability system incorporating an embodiment of the present invention.

FIG. 1 is a simplified block diagram of a diagnosability system 100 incorporating an embodiment of the present invention. Diagnosability system 100 facilitates collection, storage, communication, and analysis of diagnostic data for one or more monitored systems 110, 111, and 113. Monitored systems 110, 111, and 113 may be software systems, hardware systems, enterprise systems, and like. For example, a monitored system 110 may be a complex enterprise software system such as a database system and related products provided by Oracle Corporation™ of California. The monitored systems may be different products or different instances of the same product. The following description describes collection, storage, communication, and analysis of diagnostic data for monitored system 110. This however is not intended to limit the scope of the present invention.

As depicted in FIG. 1, diagnosability system 100 comprises a diagnosability framework 112 deployed at a system site where diagnostic data for a monitored system 110 is collected and stored. Diagnosability system 100 also comprises a diagnosability framework 116 deployed at a diagnosis site. A diagnosis site may be for example a site of a vendor that is responsible for diagnosing problems that may occur in monitored system 110.

In a typical diagnostic workflow, diagnostic data is captured and stored for monitored system 110 by diagnosability framework 112. Portions of the diagnostic data stored by diagnosability framework 112 may be communicated to diagnosability framework 116 located at the diagnosis site for analysis, such as failure analysis. The diagnostic data may be communicated from diagnosability framework 112 to diagnosability framework 116 via a communication network 114. Communication network 114 may be any network capable of communicating data such as the Internet, an intranet, a switched network, and the like. Communication network 114 may include wired or wireless communication links. Various communication protocols may be used to communicate data from diagnosability framework 112 to diagnosability framework 116.

Diagnosability framework 112 is configured to collect and store data related to monitored system 110 that may be used for monitoring the health of monitored system 110 and for diagnosing errors in monitored system 110. For example, diagnosability framework 112 may collect and store trace data, diagnostic dumps, run reports, logs (e.g., error logs), results of diagnosability related actions (e.g., results of running health checks), and the like. In one embodiment, upon occurrence of an error in monitored system 110, diagnosability framework 112 may be configured to perform targeted dumping of diagnostic data such that only diagnostic data that is relevant to the error is collected and stored.

As depicted in FIG. 1, diagnosability framework 112 comprises a diagnostic data extractor (DDE) 112a, a diagnostic data repository 112b, an information or incident packaging service (IPS) component 150, and various tools 112c. The various components depicted in diagnosability framework 112 are merely examples of components that may be included in diagnosability framework 112. In alternate embodiments, diagnosability framework 112 may have less or more components than those shown in FIG. 1. The components in diagnosability framework 112 may be implemented in software (e.g., code, program, instructions executed by a processor), hardware, or combinations thereof.

In one embodiment, DDE 112a is configured to detect occurrences of errors or other conditions in system 110 and perform one or more actions in response to the detected errors or conditions. In one embodiment, DDE 112a is rule-based engine. A DDE rule may identify one or more conditions and one or more actions to be performed when the one or more conditions are met. An action may include creating an incident for an error, gathering relevant diagnostic data for an error and storing the diagnostic data that is gathered for the error to a disk, invoking one or more health checks in response to errors or other conditions in the monitored system, recommending an action to be executed at a later point of time after the occurrence of an error or other conditions in the monitored system upon user confirmations (i.e., postmortem actions), and the like. Further information related to DDE 112a may be found in the applications incorporated by reference in the present application.

DDE 112a is configured to create an incident for an error in monitored system 110. In one embodiment, an incident is created for a critical error in monitored system 110. In this embodiment, an incident thus represents a single occurrence of a critical error in system 110. An error in system 110 may be deemed as a critical error if the error is caused due to the working of system 110. A critical error may be an internal error, a system access violation, or an external error detected in monitored system 110 (e.g., an object being accessed no longer exists). Diagnosability framework 112 is configured to collect and store diagnostic data for each incident including a description of the error(s) that caused the creation of an incident, when the error occurred, the current status of the error, a set of trace files and dumps generated for the error, and other error-related data. The data may be stored in diagnostic data repository 112b.

In one embodiment, each incident is identified using a unique numeric identifier, called the incident ID. All diagnostic data collected and stored for an incident is tagged with the incident ID for the incident. This facilitates searching and finding of data related to an incident. Each incident may also have an associated status, creation timestamp, problem key, problem identifier (problem ID), and a set of correlation keys. Correlation keys are key-value pairs that can be used for incident searching and correlation. A problem key identifies a specific problem, e.g., "ORA-600 [17182]". A problem key may include an error number, error parameter values, and other associated information. The problem key associated with an incident indicates the error that occurred resulting in the incident, a status of the incident, and a set of diagnostic data stored for the incident. A problem ID is a numeric identifier assigned to a problem. The problem ID may reflect the order in which problems were entered into the repository, such as "1", for the first problem entered into a repository, etc.

In one embodiment, a problem represents a group of incidents with the same problem key. A problem thus represents a group of incidents that are perceived to have the same symptoms. Each problem is identified by an associated problem ID. In many scenarios, problems are the unit of management for resolution and are intended to represent a single bug. The concept of a problem simplifies management of errors occurring in monitored system 110. Two incidents are considered to belong to the same problem if they have the same problem key associated with them. Multiple incidents can map to the same problem.

In one embodiment, a problem signature is generated for an incident based upon the symptoms associated with the incident. The problem signature may comprise a predetermined set of data that is used to match a problem with a set of bugs known for monitored system 110. For example, if monitored system 110 is a database such as an Oracle database, the problem signature may include the problem key, problem impacts, stacks information (e.g., function, component, error, PL/SQL information), configuration information (e.g., parameters, events, environment settings), SQL information (e.g., information on structured text, objects accessed, execution plan), product version information, etc. The problem signature may be generated along with an incident and associated with the incident.

According to an embodiment of the present invention, metadata is stored for each incident. The metadata may comprise static data that has identical structure (schema) for all incidents across all products, and dynamic data whose structure is dynamic. In the context of generation of packages, the metadata information includes correlation keys and is used for correlation of incidents, as described below. The dynamic metadata may be stored as ("attribute", "value") pairs, where the "attribute" is a name of some incident attribute (like "SESSION_ID") and the value is the specific value that is assigned for the attribute for the specific incident. An incident may have an arbitrary number of associated pairs with different sets of attributes.

Diagnostic data repository 112b (also sometimes referred to as ADR in the applications incorporated by reference in the present application) provides a centralized location for storing all diagnostic data related to monitored system 110. The information may be stored in a structured format that enables searching. For example, information related to incidents, problems, etc. may be stored in diagnostic data repository 112b. In one embodiment, diagnostic data repository 112b is a file-based repository.

In one embodiment, diagnostic data repository 112b is capable of storing diagnostic data for multiple monitored systems (which may be different products or different instances of the same product). The diagnostic data for each monitored system may be stored under a directory (e.g., an ADR_HOME directory) allocated to that system. The ADR_HOME directories share a common structure to facilitate analysis of the stored data across multiple systems. Multiple ADR_HOME directories may be present under an ADR_BASE directory.

IPS 150 is configured to identify diagnostic data that is to be transmitted from diagnosability framework 112 at the system site to diagnosability framework 116 at a diagnosis site, prepare a package including the identified diagnostic data, and transmit the package to the diagnosis site. IPS 150 provides a standard way to package diagnostic data to be sent to the diagnosis site.

IPS 150 also provides services that enable the contents of a package to be modified prior to transmission of the package from diagnosability framework 112 to diagnosability framework 116. The modification may include modification or removal of data identified to be included in the package and/or addition of additional data to the package. For example, sensitive data or other data that a customer does not want to transmit to the diagnosis site may be removed from the package prior to transmission of the package. In one embodiment, IPS 150 may provide an interface that enables a user at the system site to review and make modifications, including additions and deletions, to the diagnostic data included in a package to be transmitted to the diagnosis site. In this manner, IPS 150 enables a user of diagnosability framework 112 at the system site to control the data that is communicated to a diagnosis site from the system site.

Various tools 112c may be provided as part of diagnosability framework 112. These tools may include tools for querying the information stored in diagnostic data repository 112b, tools for generating reports, analysis tools, tools for specifying and generating packages to be transmitted to diagnosability framework 116, and other tools that may use information collected and stored by diagnosability framework 112.

Diagnosability framework 116 deployed at a diagnosis site is configured to receive data from one or more diagnosability frameworks 112 deployed at system sites. As depicted in FIG. 1, diagnosability framework 116 comprises an unpacking component 116a, a diagnostic data repository 116b, and one or more tools 116c.

As described above, diagnostic data may be communicated from diagnosability framework 112 to diagnosability framework 116 in the form of a package (e.g., a zip file, a tar file). Unpacking component 116a is configured to receive the diagnostic data transmitted from diagnosability framework 112 and unpack the diagnostic data and make the unpacked data available for analysis at the diagnosis site. In one embodiment, the data is unpacked into a format that can be consumed by users at the diagnosis site. For example, if the diagnosis site is Oracle, the data may be unpackaged into a form that can be consumed by developers and Oracle support personnel who are responsible for providing support for the monitored system. In one embodiment, unpacking component 116a is configured to route the unpackaged data to one or more recipients responsible for analyzing the data.

In one embodiment, the diagnostic data is unpackaged into diagnostic data repository 116b. Diagnostic data repository 116b thus provides a repository for storing data received from one or more system sites. In one embodiment, the structure of diagnostic data repository 116b is the same as the structures of diagnostic data repositories at system sites. This facilitates efficient storage and analysis of the data. In such an embodiment, data from a received package is unpacked and stored in the same directory location in diagnostic data repository 116b as the data was stored in diagnostic data repository 112b.

The system site platform where the diagnostic data is packaged may be different from the platform at diagnosis site. For example, system site may use a Microsoft NT platform while the diagnosis site may use a Linux platform. Further, different system sites may have different platforms such as Microsoft NT, SUN Unix, Linux 64-bit, HP, etc. The packing and unpacking operations enable transfer of diagnostic data from multiple platforms or ports into a common platform at the diagnosis site. In one embodiment, the 32-bit Linux platform is used at the diagnosis site.

Various tools 116c may be provided in diagnosability framework 116 to help analyze the diagnostic data received from diagnosability framework 112 and to guide management and resolution of problems and errors in monitored systems. These tools may include command line or GUI-based tools for use by personnel at the diagnosis site. For example, the tools may include a tool that may be used to analyze the diagnostic data received from the software system site and to identify causes for the errors, tools for automatically routing the diagnostic data to a correct entity (e.g., a particular group or department responsible for the software that experienced the error, one or more software developers responsible for solving the error, a system administrator, etc.) for diagnosis, and the like.

The various components depicted in the diagnosability framework 116 are merely examples of components that may be included in the diagnosability framework. In alternate embodiments, diagnosability framework 116 may have less or more components than those shown in FIG. 1. The components depicted in diagnosability framework 116 may be implemented in software, hardware, or combinations thereof.

The present application focuses on IPS 150 of diagnosability framework 112 and unpacking component 116a of diagnosability framework 116. Information related to the various other components of diagnosability system 100 may be found in the applications incorporated by reference in the present application.

Figure 2:
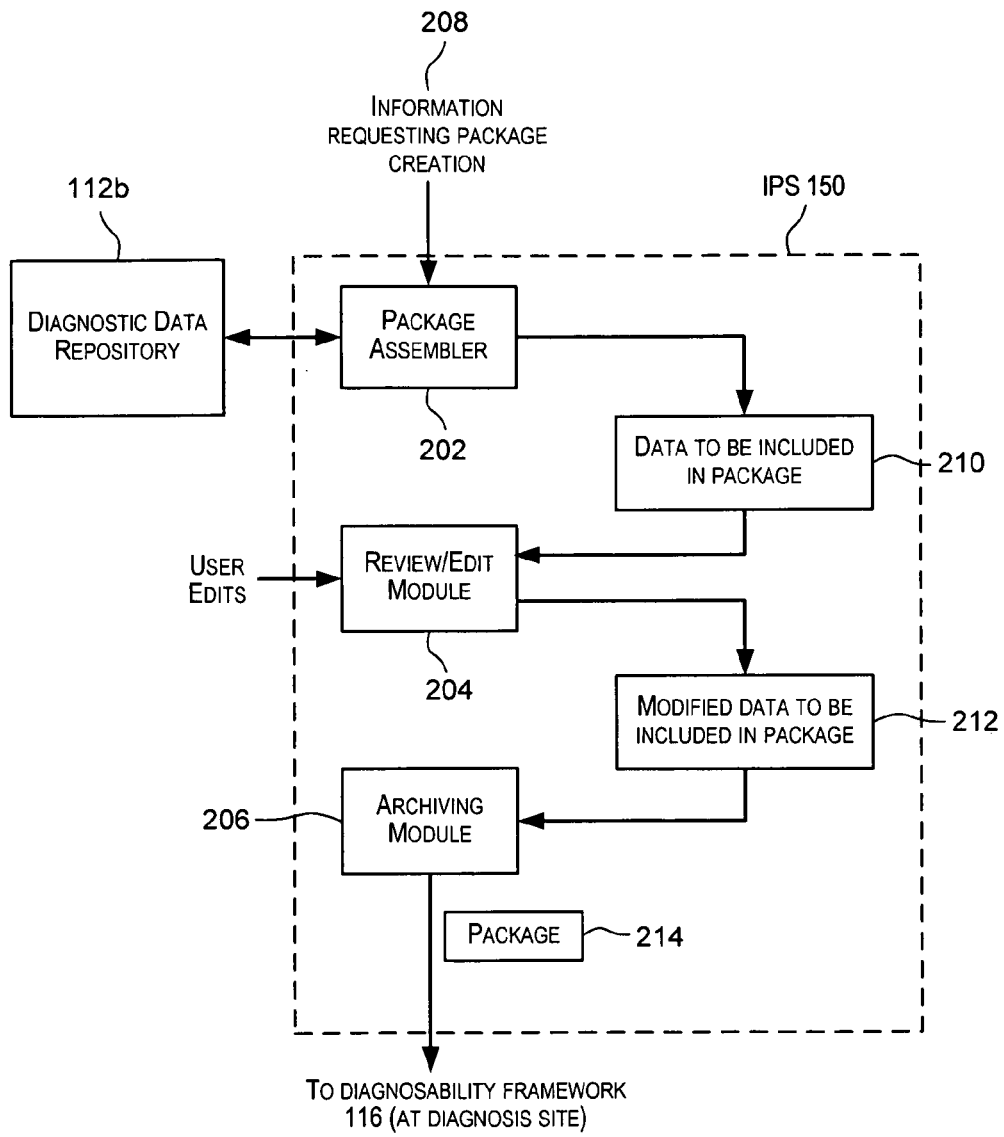
FIG. 2 is a simplified block diagram of an information packaging service (IPS) component according to an embodiment of the present invention.

FIG. 2 is a simplified block diagram of IPS 150 according to an embodiment of the present invention. As depicted in FIG. 2, IPS 150 may comprise multiple modules including a package assembler module 202, a package review/edit module 204, and an archiving module 206. The modules may be implemented in software (e.g., code, program, instructions) executed by a processor, hardware, or combinations thereof. In alternative embodiments, IPS 150 may have more or less modules than those depicted in FIG. 2. IPS 150 may execute on a single computer or on multiple computers in a distributed manner.

Package assembler 202 is configured to determine the diagnostic data to be included in a package that is to be communicated to a diagnosis site. Information 208 may be provided to package assembler 202 that is used to determine the information to be included in the package. Information 208 may comprise a request to create a package for communication to a diagnosis site. In one embodiment, packages are created for one or more problems and/or incidents. In such an embodiment, information 208 may identify the one or more problems and/or incidents for which a package is to be created and communicated to the diagnosis site. An incident may be identified using an incident ID. A problem may be identified using a problem ID.

A request to create a package may be received from a user of diagnosability framework 112. For example, a customer of monitored system 110 may request creation of a package. In one embodiment, a user interface (e.g., a GUI, a command line interface) may be provided that enables the user customer to browse through incidents and problems in monitored system 110 and select one or more incidents and/or problems for which a package is to be created. The request to create a package may also be received from a component of diagnosability framework 112.

Upon receiving information 208, package assembler 202 is configured to automatically determine diagnostic data from diagnostic data repository 112b to be included in the package. For example, if the package is to be created for a problem, package assembler 202 automatically determines, from information stored in diagnostic data repository 112b, a set of incidents related to the problem and diagnostic data related to the problem and its associated incidents that is to be included in the package. In one embodiment, problem keys associated with incidents are used to identify all incidents that map to a particular problem. The problem ID associated with the problem and the incident IDs associated with the incidents are used to find the diagnostic data to be included in the package. The diagnostic data may include files, logs, dumps, traces, run reports, and the like.

In one embodiment, in addition to incidents that are directly mapped to a problem via the incident ID—problem key mapping, package assembler 202 also identifies other incidents that are considered correlated to the problem incidents. There are several ways in which incidents may be considered to be correlated such as incidents arising from the same process, incidents occurring close to each other in time, etc. Diagnostic data related to the correlated incidents is also included in the package since it may be useful in resolution of the problem.

Based upon information 208 and the data stored in diagnostic data repository 112b, package assembler 202 determines data 210 to be included in a package. Review/edit module 204 enables data 210 that is identified to be included in a package to be reviewed and, if desired, edited prior to transmission of the data to the diagnosis site. Review/edit module 204 enables a user to review and/or modify the data identified for transmission to the diagnosis site. The package data may be modified by adding additional data to the package, by removing one or more pieces of data from data 210 identified to be included in the package, or changing the contents of data identified for inclusion in the package. For example, if the data to be included in the package comprises sensitive or confidential data (e.g., confidential customer data, financial records data) the user may remove that data from the data to be included in the package, or alternatively replace the sensitive information with non-sensitive information.

Review/edit module 204 may provide an interface (e.g., a GUI, command line interface) that enables the user to browse through the contents of data 210 identified to be included in the package. The user may make changes to the contents of the package. For example, the user may identify one or more pieces of data that are not to be communicated to the diagnosis site. The one or more user-tagged pieces of data are then removed from the data to be communicated to the diagnosis site, or may be replaced with non-sensitive data. The one or more pieces of data that are removed/replaced may represent sensitive or confidential data or other data that the user/customer does not want to communicate to the diagnosis site. In this manner, the customer at a system site is provided the ability to scrub the data included in a package prior to transmission of the package from the system site to the diagnosis site.

In one embodiment, all the data in 210 that is identified to be included in the package may be presented to the user for review. The user may then manually scrub the data. For example, the user may check out the potentially sensitive information, scrub the information, and then check in the scrubbed information for transmission to the diagnosis site. Scrubbing may involve exclusion of the sensitive information from the diagnostic information that is transmitted to the diagnosis site and/or replacement of the sensitive information with non-sensitive innocuous data. Sections of the package that have been modified may be tagged so that a person analyzing the data is made aware of the data modification. This information may be useful in the analysis of the diagnostic data at the diagnosis site.

Data that is considered sensitive may depend upon the system site and may also depend upon the customer/user. For example, information that comprises data blocks, bind variables, SQL statement, schema names, export dumps, etc. may be considered sensitive by a user. Other examples of data that may be considered sensitive include user names, IP addresses of customer machines, table contents, schema information, optimizer statistics, identifiers in a database (e.g., names of tables, names of procedures, etc.), and the like. In one embodiment, a user of the diagnosability framework can configure and define information that is considered sensitive by the user. In this manner, the data that is considered sensitive is user-configurable.

In another embodiment, review/edit module 204 may be configured to automatically identify data that is potentially sensitive or confidential to the customer or user of monitored system 110. For example, in one embodiment, review/edit module 204 may automatically identify portions of data 210 that store user data (e.g., in tables, exported database data, etc.) and present the identified portions to the user for review and modification. If the identified portions indeed contain sensitive data, then the user/customer is allowed to modify that data as desired. In another embodiment, the scrubbing may be performed automatically by the diagnosability framework 112. In one embodiment, a user's/customer's preferences for handling of sensitive information may be stored in a template and used by review/edit module 204 to identify the data to be removed from the package.

According to an embodiment of the present invention, scrubbing is performed in such a manner that while the sensitive information is scrubbed and prevented from being transmitted to the diagnosis site, the non-sensitive information related to the sensitive information which is useful for diagnosis is preserved in the package and communicated to the diagnosis site. For example, while the data contents themselves may be sensitive and thus scrubbed, information related to the structure of the sensitive data, which may useful for diagnosis of the problem, may be preserved and communicated to the diagnosis site in the package. In this manner, embodiments of the present invention enable scrubbing, while preserving or maintaining information (e.g., structure information, metadata) that is relevant and useful for diagnosis.

In the manner described above, a user/customer may ensure that diagnostic data that is communicated to the diagnosis site does not include data that the user/customer does not want to be communicated to the diagnosis site. This in turn makes it more likely that sites with more rigorous security requirements (such as financial institutions, government sites, etc.) will actually allow diagnostic data to be provided to the vendor for analysis. The ease and speed with which customers can review and make changes to the package diagnostic data is also increased.

The user may also decide to add additional data to data 210. For example, the user may create test cases to better facilitate failure analysis at the diagnosis site. The user may specifically identify the test cases and the associated data to be included in the package. The user may also tag other types of diagnostic data such as logs, dumps, traces, etc. that are to be included in the data to be shipped to the diagnosis site.

In the manner above, the user at a system site has complete control over the data that is included in a package that is communicated from the system site to the diagnosis site. Data 212 in FIG. 2 represents the modified data that is to be packaged and sent to the diagnosis site. Data 212 includes data 210 identified by package assembler 202 excluding data that is identified to be removed from the package and further including data that is specifically tagged for inclusion.

Archiving module 206 is configured to package data 212 into a form suitable for transmission to the diagnosis site. In one embodiment, data 212 is zipped into a single archive package 214. The archived package 214 is then communicated to the diagnosis site. In one embodiment, for a piece of data included in the package, the location of that piece of data in diagnostic data repository 112b is preserved in the package. For example, if the package includes a file, information identifying the path to that file in diagnostic data repository 112b is preserved in the package. This facilitates unpacking of the data into diagnostic data repository 116b on the diagnosis site.

Figure 3:
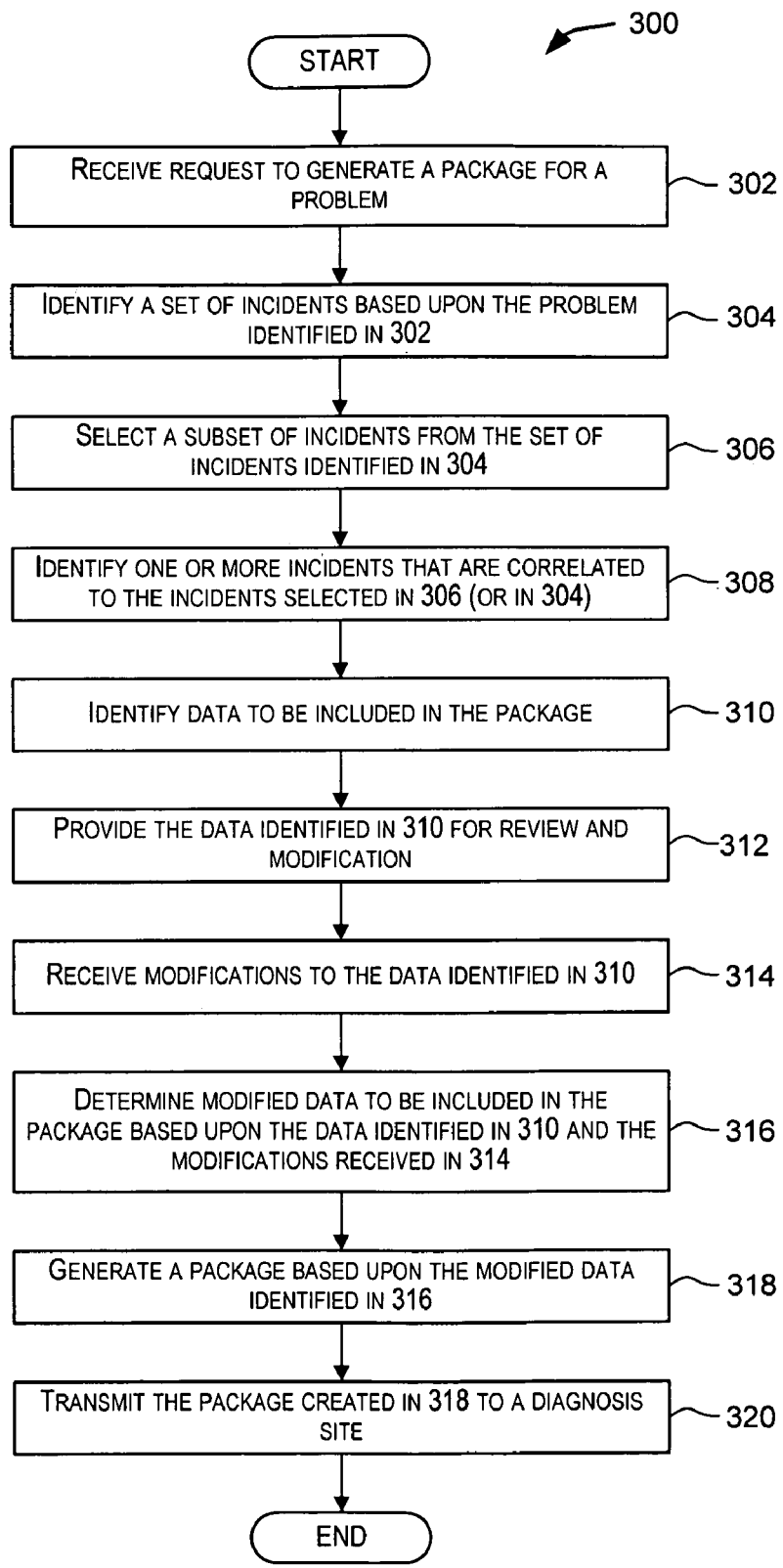
FIG. 3 is a simplified flowchart depicting a method of generating and communicating a package for a problem from a system site to a diagnosis site according to an embodiment of the present invention.

FIG. 3 is a simplified flowchart 300 depicting a method of generating and communicating a package for a problem from a system site to a diagnosis site according to an embodiment of the present invention. The processing depicted in FIG. 3 may be performed by IPS 150 depicted in FIG. 1. The method may be performed by software (e.g., code, program, instructions) executed by a processor, hardware, or combinations thereof.

As depicted in FIG. 3, information is received requesting generation of a package for a problem (step 302). The problem may be identified using a problem ID and/or a problem key. The information in 302 may be received from a user or from some component of diagnosability framework 112. A set of application programming interfaces (APIs) may also be provided to invoke generation of a package.

In one embodiment, a user interface is provided that enables a user to initiate generation of a package. The user interface enables the user to browse a list of problems and/or incidents in a monitored system and allows the user to select one or more problems and/or incidents for which a package is to be created. A package name may also be provided via the interface. Other information related to the package such as a brief description of the contents of the package, information identifying a diagnosis site (or other recipient) to which the package is to be sent, etc. may also be provided by the user via the interface. The user interface may also allow the user to review the contents of a package and make additions to or deletions from the package.

A set of incidents are then identified based upon the problem identified in 302 (step 304). The problem keys associated with the incidents and the problem ID of the problem may be used to identify the set of incidents that map to the problem. For example, incidents that have the same problem key that matches the problem key of the problem identified in 302 are identified in 304.

A subset of the incidents identified in 304 is then selected (step 306). The problem identified in 302 may have a large number of associated incidents and including all of the incidents in the package may result in a package that is very large and one that comprises unnecessary redundant data. Such a large package would also be unwieldy and non-conducive to failure analysis at the diagnosis site. Accordingly, step 306 is performed in order to reduce the amount of data that is included in a package such the data that is more likely to be useful for failure analysis is included in the package.

Various different user-configurable criteria may be used to select the incidents in 306. Only those incidents from the set of incidents identified in 304 that match the criteria may be selected in 306. Examples of criteria include: (1) selecting only a certain number (e.g., three) of latest occurring incidents; (2) selecting only a certain number (e.g., three) of earliest occurring incidents; (3) selecting incidents for which a user action (a DDE suggested action that is recommended to be executed but is not executed until permitted by the user) has been performed; (4) selecting the newest incidents where no flood control (techniques for reducing the amount of diagnostic data gathered upon occurrence of an error by limiting the gathering of possibly redundant data) has been performed; (5) others; and combinations.

A set of incidents correlated to the incidents identified in 306 (or 304) is identified (step 308). The one or more incidents identified in 308 include incidents that may not have been identified in 304 but which are considered related to the problem and useful for diagnosis of the problem. For example, when examining an incident to diagnose a problem, it may be helpful to also examine incidents that occurred within five minutes of the original incident. Such incidents are selected in 308.

Various criteria may be used to determine which incidents are correlated to the incidents identified in 306 or 304. For example, an incident may be considered correlated to an incident identified in 304 or 306 if (a) the incident was created within a certain time threshold (e.g., 5 minutes) of the incident identified in 304 or 306; (b) the error corresponding to the incident occurred in the same process as an error corresponding to an incident identified in 304 or 306; (c) the error corresponding to the incident occurred from the same monitored system component as an error corresponding to an incident identified in 304 or 306; (d) the incident has the same ECID (Execution Context ID—metadata associated with an incident) as an incident identified in 304 or 306; (e) the error corresponding to the incident occurred in the same session as an error corresponding to an incident identified in 304 or 306; (f) the incident has the same one or more associated correlation keys as an incident identified in 304 or 306; (g) the incident was generated during the same health check (diagnostic task or function that determines data related to monitored system 110) as an incident identified in 304 or 306; (h) the incident was included in a previously generated package but was not included in the present package; and the like.

As indicated above, two incidents may be correlated because they are part of a single logical operation, or they occur in the same context (like a session, or a process), etc. In one embodiment, the correlation between incidents is done based upon information stored by correlation keys in the metadata associated with the incidents. Every correlation key that is stored for an incident is an identifier for a context or logical operation. Two (or more) incidents that share the same value for the same correlation key may be considered correlated under the specific key. For example, in one embodiment, a SESSION_ID context correlation key is used to correlate incidents that occur in the same session.

In one embodiment, the following correlation keys are defined for all products, and are part of the static incident metadata stored for an incident:

(1) Incident Time;
(2) Signaling Component and sub-component. The signaling component and sub-component are derived from the last function on the call stack that does not belong to the error handling code. Every function on the call stack is statically mapped to its component, and sub-component.

(3) Suspect Component and sub-component. The suspect component (and sub-component) is a component that is in the error call stack and is likely to be the real cause of an error. For example, a memory error in the memory management component is most likely caused by some bug in a component that called the memory management component.

(4) ECID. In a product such as an Oracle database product, an Execution Context ID (ECID) is passed between different product layers to keep track of a single cross-product operation. ECID may be used for incident correlation as an incident in one layer may occur as the result of an incident in a different layer (e.g., in the database layer). In one embodiment, ECID is composed of a request ID (unique for every request), and a sequence-number (which is increased for every layer). Both parts of the ECID may be stored in the incident metadata.

(5) Impacts. Impacts describe external state or conditions that are derived from errors, for example "Data Corruption". Different products may have different impacts.

In one embodiment, the following dynamic correlation keys may be used by for determining correlated incidents: SESSION_ID, PID (process ID), Logical Operation Correlation Key, and Global transaction ID. A correlation key may also be used to correlate incidents that belong to the same logical operation. A logical operation may include all forms of parallel execution (parallel SQL, data pump, etc). A single logical operation may involve multiple parallel execution operation (as in the case of data pump). Incidents that are correlated by logical operation correlation key may belong to two different instances of a product.

Accordingly, in 308, some of the correlation keys stored in metadata associated with the incidents that may be used to find correlated incidents include keys related to: (1) time (e.g. all incidents generated within a certain time (5 minutes) before or after an incident selected in 306); (2) process id (e.g., all incidents generated for the same process id); (3) session (e.g., all incidents generated for the same session); (4) ECID (e.g., incidents generated for the same ECID); (5) transaction ID (e.g., incidents generated for the same global transaction ID); (6) parallel slaves (e.g., determined using a logical operation correlation key provided to each slave); (7) remote instance dumps (e.g., these may be correlated using the same correlation key as parallel slaves); (8) health checker run ID (e.g., all incidents generated by the same health checker run), etc. Incidents that were flood-controlled may not be selected in 308 (or 306) but may be considered when deciding which incidents to include in 308.

In one embodiment, a set of rules are configured for IPS 150 that define how correlated incidents are to be determined in 308. These rules are user configurable.

Referring back to FIG. 3, data to be included in the package is then identified based upon the problem identified in 302 and the incidents identified in 306 and 308 (step 310). In one embodiment, the diagnostic data stored in diagnostic data 112b for each of the incidents identified in 306 and 308 is identified for inclusion in the package. The data identified in 310 to be included in a package may include files generated for the selected incidents, process trace files for the selected incidents, background traces, logs, results of health checks related to the incidents, dumps generated for the incidents, status reports, and the like.

In addition to information associated with the problem and selected incidents, other information correlated to the problem or selected incidents may also be identified for inclusion in the package in 310. Metadata, including correlation keys associated with the incidents determined in 306 and 308, that is stored in diagnostic data repository 112b may be used to identify the correlated diagnostic data related to the problem and selected incidents to be included in the package. For example, IPS 150 may automatically get trace files that are correlated with the selected incidents. This correlation may be based on the process ID, or other correlation keys. For example, while diagnostic data associated with a selected incident is included in the package, it may also be useful to include trace files for other processes that are related to the original process for the incident. Such trace files may be identified for inclusion in the package in 310. The trace files may also include information such as timestamp, problem key (error message and arguments), incident number, dump name, etc. that may be used to determine the data for the selected incidents. Accordingly, the information to be included in the package is determined by correlating various criteria, such as by time, process, address space, session, etc.

In one embodiment, a set of rules are configured for IPS 150 that define how correlated data is determined for inclusion in a package in 310. These rules are user configurable.

The diagnostic data identified in 310 may then be provided for review and modification (step 312). Information may be received identifying modifications, if any, made to the diagnostic data identified in 310 (step 314). As previously described, the modifications may include deletion of one or more pieces of data from the data identified in 310, replacement of data, and/or addition of additional data to the data identified in 310. For example, sensitive data included in the data determined in 310 may be removed from the package data or replaced with non-sensitive data. It should be noted that when data included in a package is modified, the modification does not affect the actual data stored in diagnostic data repository 112a. The modification only affects what is included in the package to be sent—the diagnostic data that is stored on disk in data repository 112a is not affected. In one embodiment, this is accomplished by modifying the metadata associated with the stored diagnostic data in data repository 112a that controls what is to be included in the package to be sent to the diagnosis site. The modifications to the diagnostic data to be included in the package are reflected by changes in the metadata that controls what is to be included in the package. As indicated above, the diagnostic data to be included in the package may be modified by adding additional data to the package. Examples of information that may be added to a package may include trace files not associated with any incident identified in 306 or 308, test cases created by the user, additional dumps taken by the user, configuration information identified for inclusion in the package, and so on.

Based upon the diagnostic data determined in 310 and the modifications, if any, received in 314, modified diagnostic data to be included in the package is determined (step 316). In one embodiment, the modified data includes the data determined in 310 and modifications made to the data including removal of data, data replacements, and inclusion of additional data.

A package is then generated based upon the modified data identified in 316 (step 318). The processing in 318 may be performed by archiving module 206 depicted in FIG. 2. In one embodiment, the package is generated as a single archive using utilities such as "zip", "tar", etc. A utility such as "compress" may also be used to reduce the size of files included in the archives In one embodiment, for a piece of data included in the package, the location of that piece of data in diagnostic data repository 112b is preserved in the package. For example, if the package includes a file, information identifying the path to that file in diagnostic data repository 112b is stored in the package. This facilitates unpacking of the data into diagnostic data repository 116b on the diagnosis site. In one embodiment, the structure within diagnostic data repository 112b is also preserved within the package. The package may thus be considered as a subset of diagnostic data repository 112b.

In addition to the package, a manifest file may also be generated in 318. The manifest file is generally a text file that describes the package contents (e.g., may comprise a table of contents identifying the contents included in the package). The manifest file may also comprise instructions for unpacking and processing the contents of the package. For example, the manifest file may comprise information such as a list of files included in the package along with timestamp, size information, reasons for including the files in the package, information identifying the problem and incidents included in the package, correlation keys used to pick related incidents, user initiated actions executed for the problem and related incidents, and the like.

In some embodiments, an unpacking instructions file may also be generated in 318. This file may include information used for unpacking the package. In some embodiments, this information may be included in the manifest file itself.

The package prepared in 318 and the manifest and instruction files are then transmitted to the diagnosis site from the system site (step 320). In one embodiment, the manifest file is transmitted as a standalone file separate from the package to help the receiving user determine the package contents and how to process the package contents. The manifest file may also be included within the package (and a separate copy sent as standalone). The package may be transmitted to the diagnostic data after the package has been created or at some later scheduled time.

While FIG. 3 depicts processing for generating a package for a single problem, in alternative embodiments a package may be created for multiple problems. A package may also be created for one or more incidents. In this case, the package generation method may be triggered upon receiving incident IDs identifying the one or more incidents for which a package is to be created.

In one embodiment, a staging area (e.g., a specific directory) in diagnostic data repository 112b may be used by IPS 150 for preparing a package. Files generated as part of the packaging process representing the data to be included in the package may be gathered in this specific directory.

Several parameters may be configured for IPS 150 for controlling the packaging process. These parameters may be user-configurable and set to some default value. For example, since a problem for which a package is to be created may have several associated incidents, "ips.default_main_incidents_newest" and "ips.default_main_incidents_oldest" parameters may be provided to select specific incidents to be included in the package for the problem. The "ips.default_main_incidents_newest" and "ips.default_main_incidents_oldest" parameters may be configured to control the number of new and old incidents to be selected in step 306. The default for these parameters may be set to the three newest and three oldest incidents. An "ips.cutoff_time" parameter may be provided that specifies a cut-off time beyond which incidents are not considered for inclusion in step 306. For example, if the cut-off time is set to two months, and there are some incidents that are six months old, then those incidents will not be considered for selection in 306. The default value for this parameter may be three months. An "ips.correlation_time_window" parameter may be provided that specifies the size of the time window to use when looking for correlated incidents in step 308. Incidents that occur close to each other within the "ips.correlation_time_window" are considered correlated. The default for this parameter may be set to 5 minutes. An "ips.time_range_increase" parameter may be provided that specifies how much time should be added to each end of the package time range. The package will include metadata and information covering the earliest incident to the latest incident, extended in each direction by the value of this parameter. The default may be set to 24 hours.

In one embodiment, various options are provided to control the degree of correlation used to identify correlated incidents in 308 and to identify correlated data in 310. For example, a "basic" option may be provided which when selected results in all incident dumps and incident process trace files for the selected incidents to be included for the correlation processing. A "typical" option may be provided which when selected results in incident dumps and trace files to be included for all the selected incidents but also other files that were modified within a time period (e.g., five minutes) of the selected incidents. An "all" option may be provided which when selected results in inclusion of all dumps and trace files that were modified between the time of the first selected incident and the last selected incident.

As previously described, diagnostic data repository 112b may comprise one or more ADR_HOME directories, each ADR_HOME directory storing data for a monitored system. A package may be created for one monitored system (under one ADR_HOME directory) or for multiple monitored systems. The diagnostic data for each monitored system may be stored under a directory (e.g., an ADR_HOME directory) allocated to that system. The ADR_HOME directories share a common structure to facilitate analysis of the stored data across multiple systems. Multiple ADR_HOME directories may be present under an ADR_BASE directory. In one embodiment, a logical package may be created for a monitored system and the logical package prepared for multiple monitored systems may be combined into a single package that is then communicated from the system site to the diagnosis site.

In one embodiment, two different package types are provided: an incremental package and a cumulative or complete package. A cumulative package is a package that does not depend upon another package and is a complete package generated according to the method depicted in FIG. 3 and described above. An incremental package is a package that only includes data that has not been shipped in an earlier communicated package. A request for generating a package may indicate whether a complete or an incremental package is to be generated.

As described above, the diagnostic data that is included in a package may comprise trace files, dumps, core files, health monitor reports, data repair records, test cases (e.g., SQL test cases), incident information, and the like. Servers and processes in a monitored system write information to files known as trace files. Trace files for a process are updated periodically over the life of the process and comprise information on the process environment, status, activities, and errors. When a process detects a critical error, information about the error is written to the process trace file. Trace files sometimes are accompanied by corresponding trace map files, which comprise structural information about the trace files and may be used for searching and navigating the trace files. A dump is generally a specific type of trace file. A dump is typically a one-time output of diagnostic data in response to an event (such as a new incident). A core file contains a memory dump, typically in a binary, port-specific format.

In one embodiment, two methods are provided for creating and uploading a package to a diagnosis site: a quick packaging method and a custom packaging method. For both methods, a wizard may be provided to guide a user through the package creation process.

The quick packaging method is a simpler and more automated method of creating a package for a single problem. The user can select the problem for which the package is to be created, provide a package name and description, and then schedule a time for uploading the package to the diagnosis site, either immediately or at a later specified date and time. IPS 150 is configured to automatically determine and place diagnostic data related to the problem into the package, create a zip file for the package, and then upload the file. With this method, the user is not provided the opportunity to add, edit, or remove package files or add other diagnostic data to the package.

A user may use custom packaging to create a package for one or more problems and/or incidents. A user may also add data related to one or more problems/incidents to an existing package. The user is also allowed to edit the contents of the package including adding or removing problems or incidents, adding, editing, or removing files (e.g., trace files, external files) in the package and adding other diagnostic data such as SQL test cases. A package may then be created once the user has indicated that all edits have been completed. The user may further view the package contents to determine if the package is to be further edited to remove sensitive data or to reduce package size. The operations may be conducted over a period of time (e.g., a number of days) before the user decides that the package has sufficient diagnostic information to be sent to the diagnosis site.

Using embodiments of the present invention, the task of gathering of information to be sent to a diagnosis site is automated. The customer at the system site no longer needs to have the technical knowledge required to locate relevant information to be sent to the vendor for analysis. By using correlations and metadata to make decisions regarding the data to be sent to the diagnosis site, data that is more relevant for error diagnosis is sent to the diagnosis site. This in turn reduces the time to resolve customer issues, leading to less operational impact and higher customer satisfaction. IPS 150 gathers sufficient information for a failure that increases the probability of diagnosing the failure upon the first occurrence of the failure and finding the root cause (e.g., the first incident that triggers the problem, other incidents may just be the effect of the first incident) of the problem. The customer does not have to know the technical details of the product (or monitored system) in order to determine what information is to be sent to the vendor for diagnosis. The customer thus need not be an expert in the product.

Figure 4A:
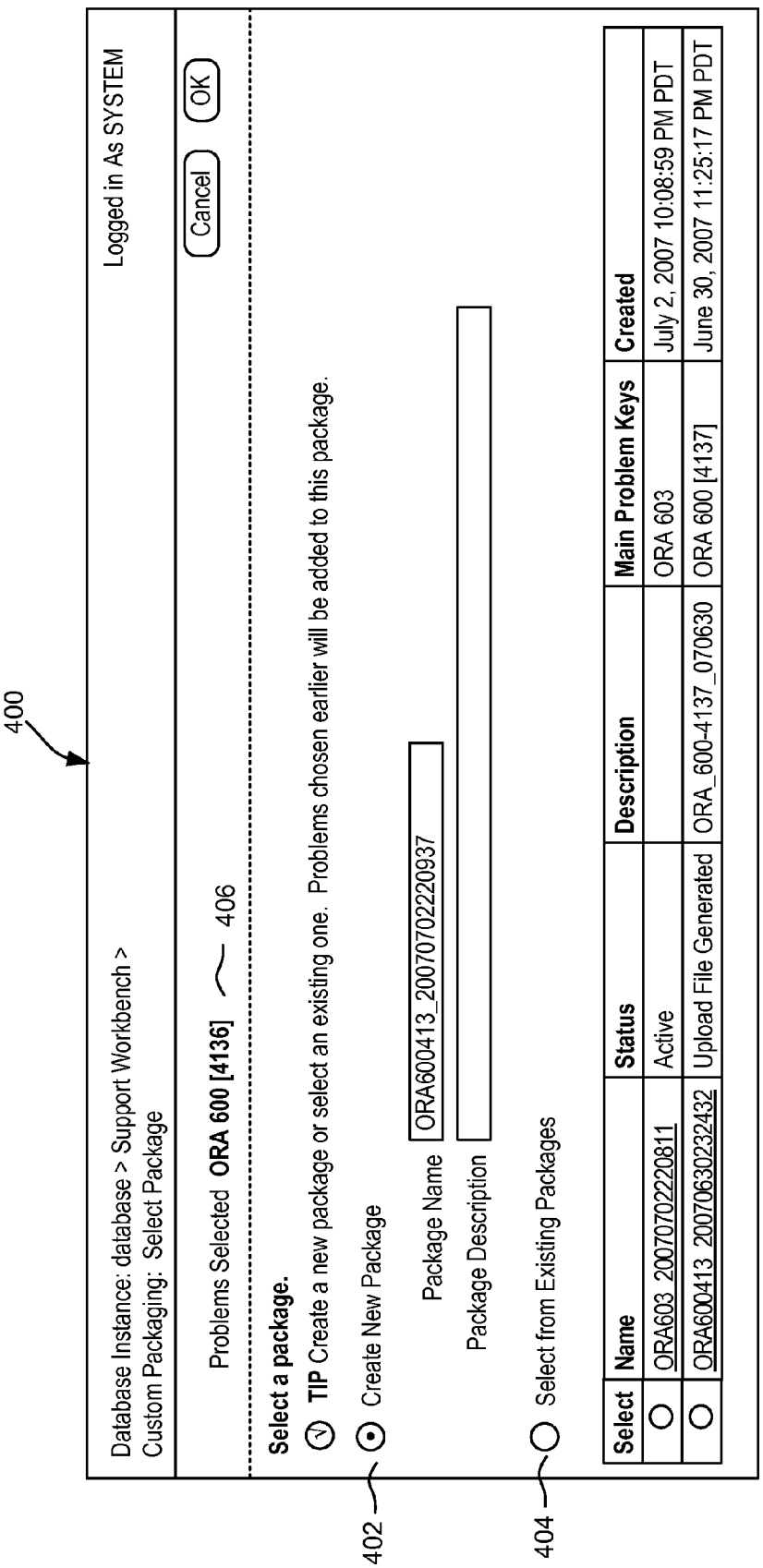

FIGS. 4A, 4B, 4C, and 4D depict various interfaces for generating packages according to an embodiment of the present invention. FIG. 4A depicts a GUI 400 for initiating creation of a package. A new package may be requested by selecting option 402 or a package may be selected from an existing set of packages by selecting option 404. A package name and a brief description may be provided for a new package. Information 406 is displayed identifying the problem for which a new package is to be generated.

Figure 4B:
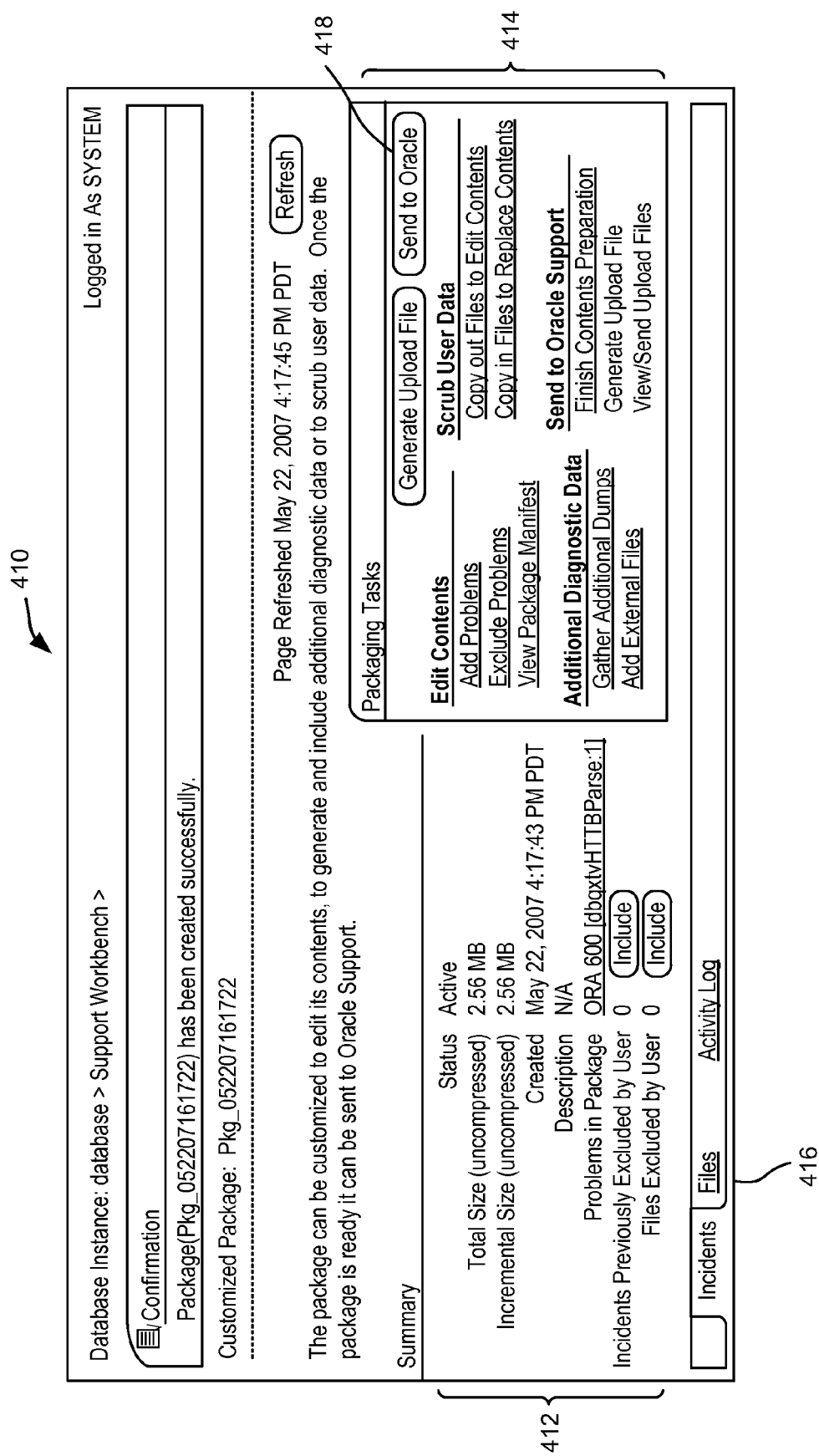

FIG. 4B depicts a GUI 410 displaying information related to package contents and providing options for making changes to the package contents according to an embodiment of the present invention. As shown, information 412 related to a package is displayed including the size of the package, a time when the package was created, problems included in the package, and other information. Incidents and files specifically excluded from the package by a user are also identified in 412. A "Files" link 416 may be selected to view the files that are included in the package.

Options 414 are provided that enable a user to make changes to the package contents. Options 414 include a set of options to edit the package contents including options to add problems to the package, exclude problems from a package, and to view a package manifest. A set of options is also provided for scrubbing data included in the package including options to copy out a file to edit its contents and copy in an edited version of the file to replace the original file. In this embodiment, in order to change the contents of a package, a user may issue a command to copy a file in the package that is to be changed to a designated directory. The file copy may then be edited by the user with a text editor or some other utility. After the user is done editing the file copy, the user may issue a command that results in the edited file copy being copied back into the package, replacing the original file. Editing the file copy does not affect the data stored in diagnostic data repository 112*b*, but the package now includes an edited version of the data. A set of options is also provided for adding additional diagnostic data to the package including options for gathering additional dumps and adding external files to the package. A set of options is also provided for communicating the package to the diagnosis site. A button 418 is also provided which when selected initiates transfer of the package to the diagnosis site.

Figure 4C:

FIG. 4C depicts an interface 420 that displays a list of files included in a package to a user and enables the user to select one or more files to be copied out of the package according to an embodiment of the present invention. The selected files that are copied out may then be edited by the user and the edited files may then be copied back into the package to replace the original files. The files may be copied out to enable the user to modify the files, such as to delete sensitive information or to replace sensitive information in the file with non-sensitive information. In this manner, a user may scrub or remove/change sensitive information in one or more files included in a package.

FIG. 4D depicts an interface 430 that enables a user to exclude files from a package and/or add incident files or external files to a package according to an embodiment of the present invention. As depicted in FIG. 4D, a list of files included in a package is displayed. A user may select one or more of the displayed files and then select "Exclude" button 432 to exclude the selected files from the package. A button "Add Incident Files" 434 is provided that enables the user to add incident files to the package. A button "Add External Files" 436 is provided that enables the user to add other external files to the package.

Figure 5:
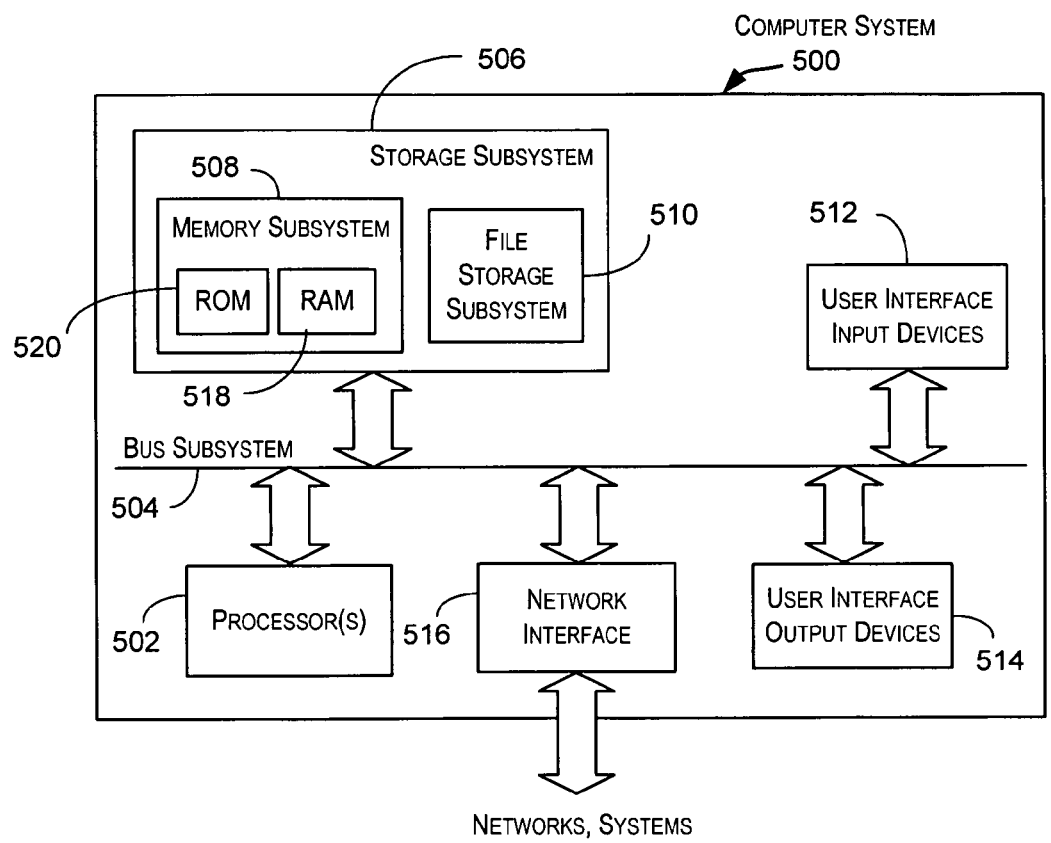
FIG. 5 is a simplified block diagram of a computer system that may be used to practice an embodiment of the present invention.

FIG. 5 is a simplified block diagram of a computer system 500 that may be used to practice an embodiment of the present invention. Computer system 500 may serve as a processing platform for diagnosability framework 112 at a system site depicted in FIG. 1. A computer system located at the diagnosis site may serve as a processing platform for diagnosability framework 116. A diagnosability framework, either 112 or 116, may also be distributed across multiple computer systems such as the one depicted in FIG. 5.

As shown in FIG. 5, computer system 500 includes a processor 502 that communicates with a number of peripheral subsystems via a bus subsystem 504. These peripheral subsystems may include a storage subsystem 506, comprising a memory subsystem 508 and a file storage subsystem 510, user interface input devices 512, user interface output devices 514, and a network interface subsystem 516.

Bus subsystem 504 provides a mechanism for letting the various components and subsystems of computer system 500 communicate with each other as intended. Although bus subsystem 504 is shown schematically as a single bus, alternative embodiments of the bus subsystem may utilize multiple busses.

Network interface subsystem 516 provides an interface to other computer systems, networks, and portals. Network interface subsystem 516 serves as an interface for receiving data from and transmitting data to other systems from computer system 500. For example, for diagnosability framework 112 deployed at the system site, network interface subsystem 516 may be configured to transfer diagnostic packages from the system site to the vendor or diagnosis site.

User interface input devices 512 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 500.

User interface output devices 514 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 500.

Storage subsystem 506 provides a computer-readable medium for storing the basic programming and data constructs that provide the functionality of the present invention. Software (programs, code modules, instructions) that when executed by a processor provide the functionality of the present invention may be stored in storage subsystem 506. These software modules or instructions may be executed by processor(s) 502. Storage subsystem 506 may also provide a repository for storing data used in accordance with the present invention, for example, the data stored in the diagnostic data repository. Storage subsystem 506 may comprise memory subsystem 508 and file/disk storage subsystem 510.

Memory subsystem 508 may include a number of memories including a main random access memory (RAM) 518 for storage of instructions and data during program execution and a read only memory (ROM) 520 in which fixed instructions are stored. File storage subsystem 510 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 500 can be of various types including a personal computer, a portable computer, a workstation, a network computer, a mainframe, a kiosk, a server or any other data processing system. Due to the ever-changing nature of computers and networks, the description of computer system 500 depicted in FIG. 5 is intended only as a specific example for purposes of illustrating the preferred embodiment of the computer system. Many other configurations having more or fewer components than the system depicted in FIG. 5 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. While the embodiments of the diagnosability framework have been described as providing diagnostic support for software product instances, in alternative embodiments, embodiments of the present invention may be used for providing diagnostic support for software products, hardware products, or products having combination of software and hardware.

Further, while the present invention has been described using a particular combination of hardware and software, it should be recognized that other combinations of hardware and software are also within the scope of the present invention. The present invention may be implemented using hardware, software, or combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the inventions.

What is claimed is:

1. A method of identifying diagnostic data for communication from a first site to a second site, the method comprising:
    receiving, by a computer system at the first site, a request to create a package to be communicated from the first site to the second site;
    identifying, by the computer system, a first set of one or more incidents in response to the request, each incident corresponding to an error in a system at the first site;
    identifying, by the computer system, a second set of incidents correlated to the first set of incidents,
    wherein each first incident in the first set of incidents is correlated to a second incident in the second set of incidents, correlation being based upon information values stored by correlation keys in metadata associated with the incidents, and
    a first value stored by a correlation key in metadata associated with the first incident is the same as a second value stored by the correlation key in metadata associated with the second incident;
    determining, by the computer system, diagnostic data for the first set of incidents and the second set of incidents; and
    preparing, by the computer system, a package comprising the diagnostic data determined for the first set of incidents and the second set of incidents.

2. The method of claim 1 wherein:
    the request identifies a problem; and
    identifying the first set of incidents comprises:
        identifying a plurality of incidents based upon the problem; and
        determining the first set of incidents from the plurality of incidents, wherein the first set of incidents is a subset of the plurality of incidents.

3. The method of claim 2 wherein identifying the plurality of incidents comprises determining incidents that correspond to the problem based upon a problem key associated with each incident, the problem key associated with an incident identifying a set of attributes associated with the incident.

4. The method of claim 3 wherein all the incidents included in the plurality of incidents have the same associated problem key.

5. The method of claim 2 wherein determining the first set of incidents comprises determining the first set based upon a time associated with the incidents in the plurality of incidents.

6. The method of claim 1 wherein the request identifies one or more incidents.

7. The method of claim 1 wherein determining the second set of incidents comprises:
determining the second set of incidents based upon one or more correlation keys associated with the second set of incidents and one or more correlation keys associated with the first set of incidents, wherein each correlation key associated with an incident specifies an attribute and a value associated with the attribute for the incident.

8. The method of claim 1 wherein determining the second set of incidents comprises:
determining if an incident is to be included in the second set of incidents based upon a value associated with an attribute of the incident and a value associated with the same attribute of at least one incident in the first set of incidents.

9. The method of claim 8 wherein the attribute of an incident is a time when the incident was created, a process or system component or session in which an error that caused creation of the incident occurred, a logical operation that resulted in an error that caused creation of the incident, or a context identifier associated with the incident.

10. The method of claim 1 further comprising determining diagnostic data that is correlated to the diagnostic data determined for the first set of incidents and the second set of incidents, and wherein preparing the package comprises including the correlated diagnostic data in the package.

11. The method of claim 10 wherein determining the correlated diagnostic data comprises determining the correlated diagnostic data using one or more correlation keys associated with the first set of incidents and the second set of incidents, wherein each correlation key associated with an incident specifies an attribute and a value associated with the attribute.

12. The method of claim 1 further comprising communicating the package from the first site to the second site.

13. A non-transitory computer readable storage medium storing a plurality of instructions for controlling a processor to identify diagnostic data for communication from a first site to a second site, the plurality of instructions comprising:
instructions that cause the processor to receive, at the first site, a request to create a package to be communicated from the first site to the second site;
instructions that cause the processor to identify a first set of one or more incidents in response to the request, each incident corresponding to an error in a system at the first site;
instructions that cause the processor to identify a second set of incidents correlated to the first set of incidents,
wherein each first incident in the first set of incidents is correlated to a second incident in the second set of incidents, correlation being based upon information values stored by correlation keys in metadata associated with the incidents, and
a first value stored by a correlation key in metadata associated with the first incident is the same as a second value stored by the correlation key in metadata associated with the second incident;
instructions that cause the processor to determine diagnostic data for the first set of incidents and the second set of incidents; and
instructions that cause the processor to prepare a package comprising the diagnostic data determined for the first set of incidents and the second set of incidents.

14. The non-transitory computer readable storage medium of claim 13 wherein:
the request identifies a problem; and
the instructions that cause the processor to identify the first set of incidents comprise:
instructions that cause the processor to identify a plurality of incidents based upon the problem; and
instructions that cause the processor to determine the first set of incidents from the plurality of incidents, wherein the first set of incidents is a subset of the plurality of incidents.

15. The non-transitory computer readable storage medium of claim 14 wherein the instructions that cause the processor to identify the plurality of incidents comprise instructions that cause the processor to determine incidents that correspond to the problem based upon a problem key associated with each incident, the problem key associated with an incident identifying a set of attributes associated with the incident.

16. The non-transitory computer readable storage medium of claim 13 wherein the instructions that cause the processor to determine the second set of incidents comprise:
instructions that cause the processor to determine the second set of incidents based upon one or more correlation keys associated with the second set of incidents and one or more correlation keys associated with the first set of incidents, wherein each correlation key associated with an incident specifies an attribute and a value associated with the attribute for the incident.

17. The non-transitory computer readable storage medium of claim 13 wherein:
the plurality of instructions further comprises instructions that cause the processor to determine diagnostic data that is correlated to the diagnostic data determined for the first set of incidents and the second set of incidents; and
the instructions that cause the processor to prepare the package comprise instructions that cause the processor to include the correlated diagnostic data in the package.

18. The non-transitory computer readable storage medium of claim 13 wherein the plurality of instructions further comprises instructions that cause the processor to communicate the package from the first site to the second site.

19. A system located at a first site for identifying diagnostic data for communication from the first site to a second site, the system comprising:
a memory; and
a processor coupled to the memory;
wherein the processor is configured to:
receive a request to create a package to be communicated to the second site;
identify a first set of one or more incidents in response to the request, each incident corresponding to an error in a monitored system;
identify a second set of incidents correlated to the first set of incidents,
wherein each first incident in the first set of incidents is correlated to a second incident in the second set of incidents, correlation being based upon information values stored by correlation keys in metadata associated with the incidents, and
a first value stored by a correlation key in metadata associated with the first incident is the same as a second value stored by the correlation key in metadata associated with the second incident;
determine diagnostic data for the first set of incidents and the second set of incidents; and prepare a package comprising the diagnostic data determined for the first set of incidents and the second set of incidents.

20. The system of claim 19 wherein:
the request identifies a problem; and
the processor is configured to:
    identify a plurality of incidents based upon the problem; and
    determine the first set of incidents from the plurality of incidents, wherein the first set of incidents is a subset of the plurality of incidents.

21. The method of claim 1, wherein the diagnostic data comprises diagnostic files, diagnostic logs, diagnostic dumps, trace data, run reports, or a combination thereof.

22. The method of claim 1, wherein the diagnostic data comprises files generated for the first and second incidents, process trace files for the first and second incidents, results of health checks relative to the first and second incidents, or a combination thereof.

23. The method of claim 1, wherein the correlation key identifies a time of creation of the incident, and the first incident is correlated to the second incident in response to the first incident being created within a certain time threshold of the second incident.

24. The method of claim 1, wherein the correlation key identifies a process, system component, or session in which an error that caused creation of the incident occurred.

25. The method of claim 1, wherein the correlation key identifies a logical operation that resulted in an error that caused creation of the incident.

26. The method of claim 1, wherein the correlation key comprises a context identifier associated with the incident.

27. The method of claim 1, further comprising: identifying correlated diagnostic data that is correlated with the first and second incidents, wherein the first value stored by a correlation key in metadata associated with the first and second incidents is the same as a third value stored by the correlation key in the correlated diagnostic data, and
    the diagnostic data for the first set of incidents and the second set of incidents comprises the correlated diagnostic data.

28. The method of claim 27, wherein the correlated diagnostic data comprises a trace file for at least one other process, wherein the trace file is correlated with the first set of incidents and the second set of incidents, and the trace file includes a time stamp, a problem key, an error message, an incident number, or a combination thereof.

29. The method of claim 27, wherein the correlation key identifies a time, a process, an address space, a session, or a combination thereof.

* * * * *

UNITED STATES PATENT AND TRADEMARK OFFICE
CERTIFICATE OF CORRECTION

| | | |
|---|---|---|
| PATENT NO. | : 8,260,871 B2 | Page 1 of 1 |
| APPLICATION NO. | : 12/251700 | |
| DATED | : September 4, 2012 | |
| INVENTOR(S) | : Fallen et al. | |

It is certified that error appears in the above-identified patent and that said Letters Patent is hereby corrected as shown below:

On page 3, in column 1, under "Other Publications", line 21, delete "B.V. Zhang," and insert -- Zhang, --, therefor.

In column 14, line 62, delete "archives" and insert -- archive. --, therefor.

Signed and Sealed this
Eighteenth Day of December, 2012

David J. Kappos
*Director of the United States Patent and Trademark Office*